United States Patent [19]

Gillham

[11] Patent Number: 5,534,154
[45] Date of Patent: * Jul. 9, 1996

[54] SYSTEM FOR CLEANING CONTAMINATED SOIL

[75] Inventor: Robert W. Gillham, Guelph, Canada

[73] Assignee: University of Waterloo, Waterloo, Canada

[*] Notice: The portion of the term of this patent subsequent to Oct. 22, 2013, has been disclaimed.

[21] Appl. No.: 137,195

[22] PCT Filed: Apr. 24, 1992

[86] PCT No.: PCT/GB92/00759

§ 371 Date: Oct. 22, 1993

§ 102(e) Date: Oct. 22, 1993

[87] PCT Pub. No.: WO90/19556

PCT Pub. Date: Nov. 12, 1992

[30] Foreign Application Priority Data

Apr. 25, 1991 [GB] United Kingdom ............ 91/09071

[51] Int. Cl.$^6$ .................................................. C02F 1/28
[52] U.S. Cl. .................... 210/668; 210/679; 210/694; 210/747; 210/170; 210/503
[58] Field of Search ........................ 210/679, 694, 210/747, 170, 503, 668

[56] References Cited

U.S. PATENT DOCUMENTS

| | | | |
|---|---|---|---|
| 3,784,014 | 1/1974 | Turner | 210/263 |
| 3,803,033 | 4/1974 | Sutherland | 210/695 |
| 4,234,420 | 11/1980 | Turbeville | 210/695 |
| 5,057,227 | 10/1991 | Cohen | 210/747 |
| 5,064,534 | 11/1991 | Busch et al. | 210/266 |
| 5,149,437 | 9/1992 | Wilkinson et al. | 210/668 |
| 5,266,213 | 11/1993 | Gillham | 210/747 |

FOREIGN PATENT DOCUMENTS

| | | |
|---|---|---|
| 0012162 | 6/1980 | European Pat. Off. |
| 62-149400 | 7/1987 | Japan. |
| 3-0008495 | 1/1991 | Japan. |
| 91/04949 | 4/1991 | WIPO. |
| 91/08176 | 6/1991 | WIPO. |

Primary Examiner—Ivars C. Cintins
Attorney, Agent, or Firm—Anthony Asquith & Co.

[57] ABSTRACT

Water contaminated with halogenated organics, including chloroform, trichloroethane, solvents, pesticides, etc. is treated by passing the water through a permeable mixture of activated carbon and iron fillings. When the mixture is brought to a negative Eh voltae, the metal causes the contaminants to undergo chemical breakdown. The activated carbon acts to retard the contaminant, giving it a long residence time close to the iron. The negative Eh conditions demand oxygen exclusion, such that a favoured application is to place the mixture in a trench below the water table in an aquifer, in the path of a plume of contaminant. The mixture may also be contained in a tank above, or in, the ground. An inert filler material, such as sand, may be included in the mixture.

17 Claims, 3 Drawing Sheets

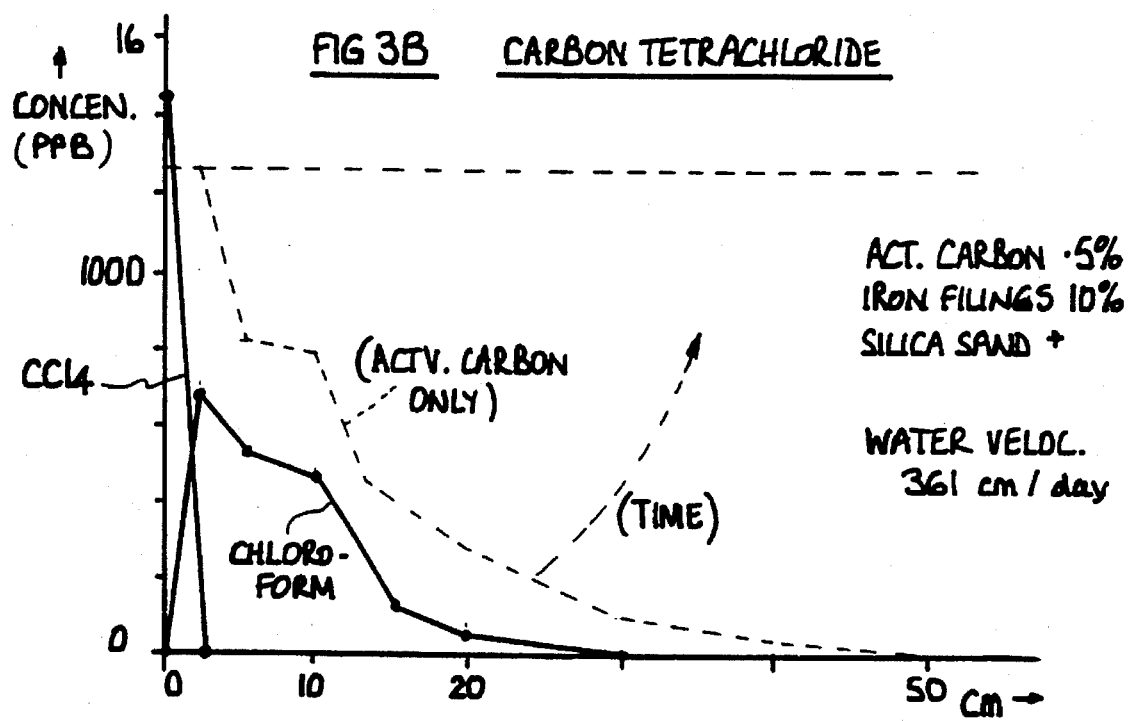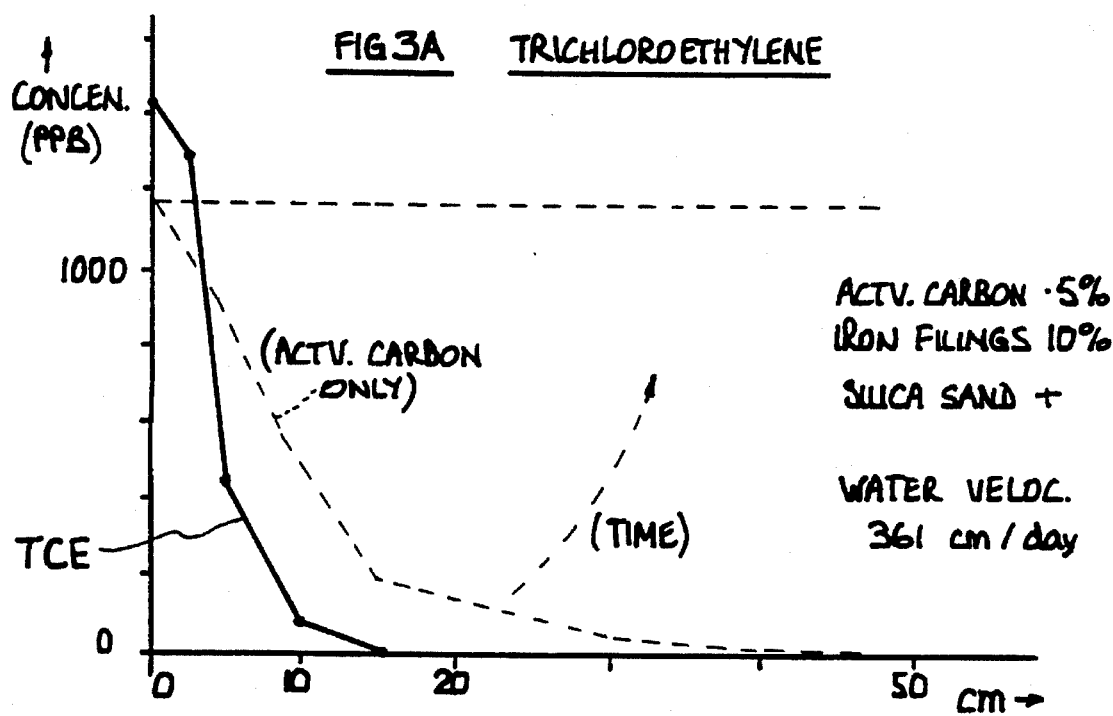

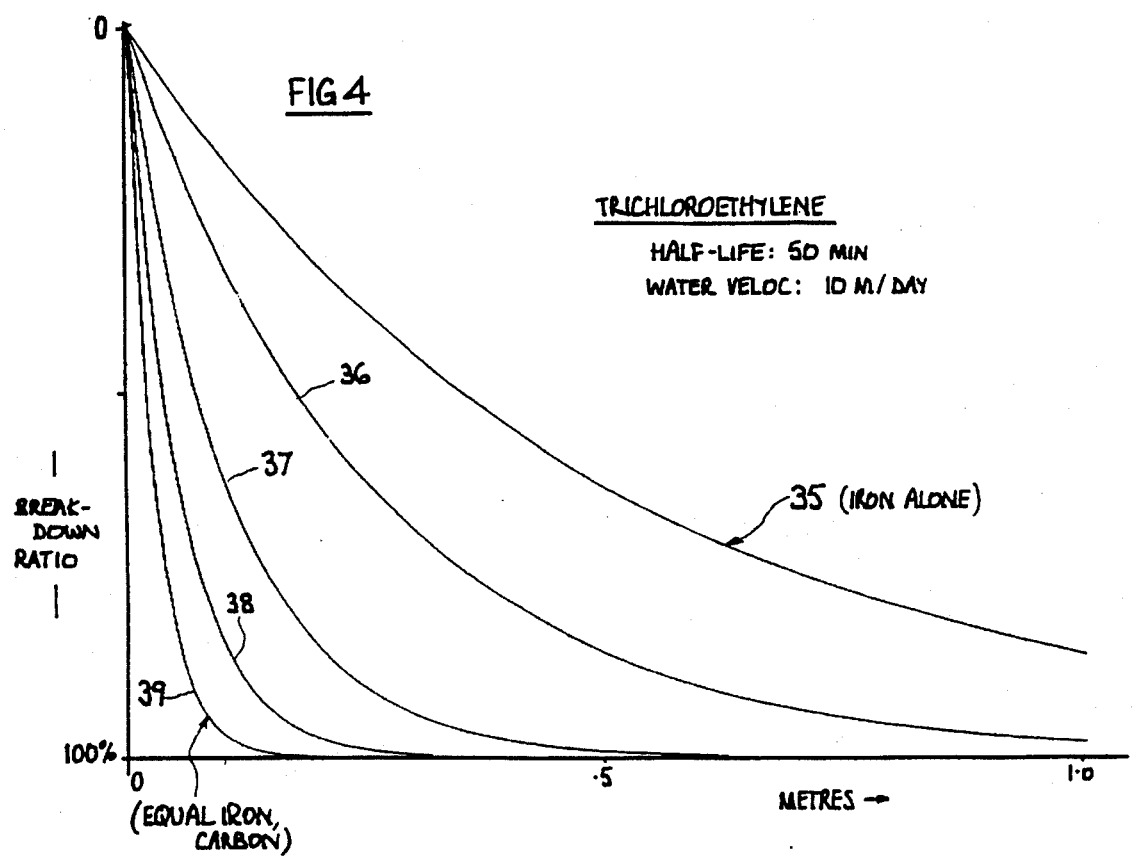

SYSTEM FOR CLEANING CONTAMINATED SOIL

This invention relates to the cleaning of contaminated water.

The invention is mainly concerned with the cleaning of groundwater in its native aquifer, or of effluent water discharged from a manufactory.

The invention is not limited in scope only to specific contaminants, but the contaminants with which the invention is mainly concerned are those which are carcinogenic or otherwise hazardous in trace quantities, and which are difficult to break down chemically. A typical example of the type of contaminant is the halogenated hydrocarbon (organic) type, which includes eg chloroform; solvents such as carbon tetrachloride; and pesticides such as DDT.

THE PRIOR ART

One of the well-known conventional systems for removing contaminants from water is to pass the contaminated water through a body of activated carbon. Activated carbon is highly adsorptive material, whereby the dissolved contaminants are removed from the water and retained on the activated carbon.

Over a period of time, the contaminant builds up on the activated carbon. One way of dealing with the activated carbon that has become saturated with the contaminant is to periodically remove the activated carbon, and dispose of it as a hazardous waste.

Alternatively, periodically the activated carbon may be flushed or otherwise treated (eg by heating) to remove or drive off the contaminated material that has accumulated. When the activated carbon has been flushed it can be re-used. The contaminants however still exist, and must be disposed of.

Thus, one of the disadvantages of the conventional decontamination systems based on the use of activated carbon is that the contaminant remains intact. In the conventional system, the activated carbon functions simply to strip the contaminant out of the water; the contaminant material that is removed from the activated carbon upon flushing is still hazardous. In fact, it is even more hazardous because it is concentrated. The contaminant may finally be broken down in a further treatment facility, or it may be disposed of as a hazardous waste.

It is an aim of the invention to provide a decontamination system in which contaminants, such as those of the halogenated organic type, are broken down into harmless, or at least less hazardous, chemical substances.

It is also known in the art to pass an halogenated-organic contaminant through a permeable body comprising a pair of metals. It has been found that the halogenated-organic materials break down, when in prolonged contact with the pair of metals, inferredly by a form of hydrolysis reaction, into chlorides etc; these substances generally are virtually harmless in trace quantires, and often will precipitate out of the water as insoluble solids.

One of the disadvantages with the above "metals" system is that substantial periods of time, and/or substantial quantities of the metals are required. The system can be expensive, not only as regards providing the metals, but also as regards arranging for a sufficient residence time of the water within the body of metals, and as regards creating the best conditions of pH level, temperature, oxidizing/reducing conditions, etc, throughout that residence time.

The great advantage of the "metals" system is that the hazardous material disappears.

It is an aim of the invention to provide a decontamination system in which, as in the known "metals" system described above, the hazardous materials are broken down and converted into relatively harmless chemical compounds; it is also an aim to achieve this breakdown of the contaminants using substantially smaller quantities of metal.

GENERAL FEATURES OF THE INVENTION

In the invention, the contaminated water is passed through a permeable body comprising a mixture of an adsorptive material, such as activated carbon, and a metal, such as iron.

It is recognized that the function which the adsorptive material performs when mixed with the metal is substantially different from its conventional function as a mere adsorber of the contaminant. Rather, it may be regarded that the adsorptive material acts as a retarder, to retard the passage of the contaminant, and to keep the contaminant in close proximity to the metal for a very long period. The effect is to increase the residence time in which the contaminant remains in contact with the metal, just as if a very large body of the metal had been provided.

The water itself may pass through the body in a short time period, as determined by the permeability of the body, the differential pressures, etc.

When the body did not include an adsorbing material, as in the conventional "metals" system, the contaminants were retarded hardly at all, and travelled through the body in virtually the same time period as the water. (It may be noted that many dissolved contaminants and other substances are naturally retarded to some degree, relative to the water in which they are dissolved, when passing through an aquifer. But this natural retardation, which indeed is not always small, is of little significance when compared with the retardation that is attributable to the activated carbon or other adsorption material, in the invention.)

It was known in the conventional systems to mix the metals with sand or other inert filler material, whereby the bulk of the body through which the water had to pass could be increased; and this measure had some effect in increasing the residence time. However, the increase in residence time was more or less simply proportional to the increase in bulk: in the invention, wherein the metal is mixed with an adsorptive material such as activated carbon, the residence time may be increased by an order of magnitude, or more, greater than would be accounted for by the simple increase in bulk volume.

In the invention, the adsorptive material is not in fact acting as a mere adsorber, since the contaminant is broken down: nor is the adsorptive material acting simply as a bulk filler material. The adsorptive material co-operates with the metal with which it is mixed, to retain the molecules of the contaminant substances in contact with the metal for a long period, thereby aiding in the effectiveness of the metal in breaking down the contaminant. The adsorptive material does not act to retard the flow of water through itself, but rather the adsorptive material acts to retard the movement of the contaminant molcules so that those molecules spend a considerable time in the presence of the metal.

It is recognized that the performance of the mixture of adsorptive material plus metal, as regards the quantity of metal needed to decontaminate the water, and the rate at which the water can be decontaminated, far exceeds that of the metal by itself.

In order for the metal to be effective in causing the chemical breakdown of the contaminant, the reduction/oxidation condition of the metal must be under strict control. As measured by an Eh probe, the Eh voltage must drop below −200 millivolts, and preferably below −600 mv, for the breakdown to occur. Therefore, the mixture, and the water passing through it, must be kept under strictly anaerobic conditions. Whatever available oxygen is present in the water, or in the materials of the mixture, will lead to time-inefficiencies, because such available oxygen will have to be consumed in order for the Eh voltage to become negative, and before the degradation of the contaminant can commence.

DETAILED DESCRIPTION OF PREFERRED EMBODIMENT

By way of further explanation of the invention, an exemplary embodiment of the invention will now be described with reference to the accompanying drawings, in which:

FIGS. 3A and 3B and FIG. 4 are graphs which illustrate the manner of degradation of a typical contaminant as the water flows through a mixture of activated carbon and metal.

The apparatus and procedures shown in the accompanying drawings and described below are examples which embody the invention. It should be noted that the scope of the invention is defined by the accompanying claims, and not necessarily by specific features of exemplary embodiments.

Figure 1:
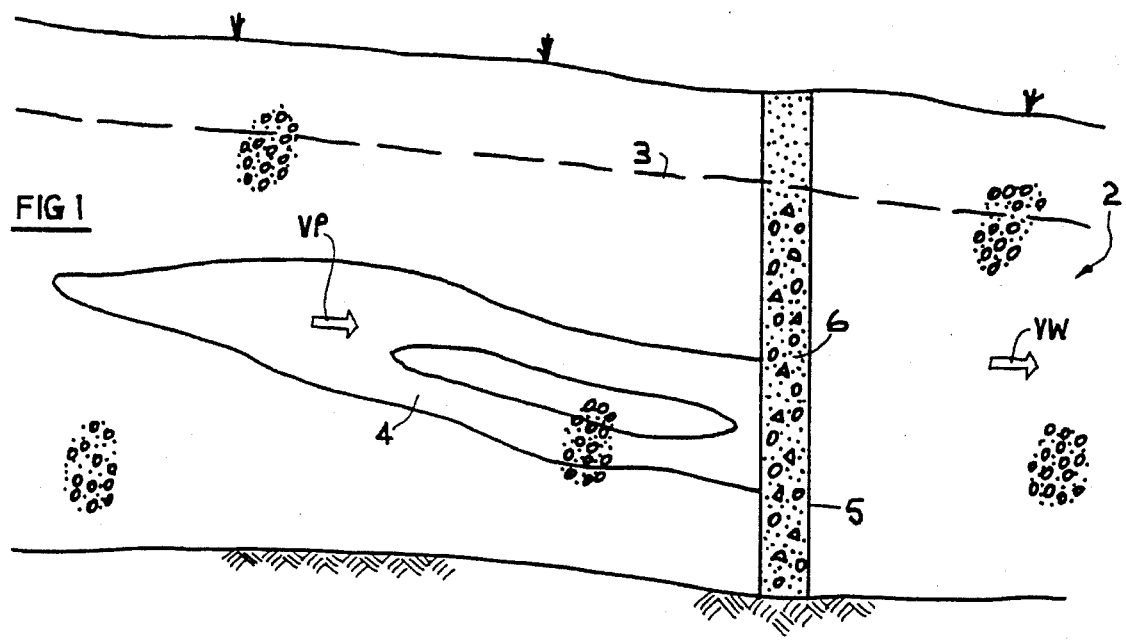
FIG. 1 is a cross-section through an aquifer, the water in which is being treated in a manner which embodies the invention.

The aquifer 2 shown in FIG. 1 is saturated with water up to the level 3 of the water table. The groundwater is moving through the aquifer with a velocity VW. A plume 4 of a contaminant is moving along with the water. The velocity of the contaminant will tend naturally to be somewhat retarded relative to the groundwater, in its passage through the aquifer, whereby the contaminant in the plume is moving through the aquifer with a slower velocity VP.

The contaminant is of the halogenated hydrocarbon (organic) type, which term includes, for example, carbon tetrachloride. The contaminant may have arisen because of a spill of known origin that must be cleaned up by those responsible, or the contaminant may be from an unknown source but has been detected as heading for a well, for example.

A trench 5 is excavated down into the material of the aquifer 2, in the path of the plume 4. Into the trench 5 is placed a permeable body comprising a mixture 6 of activated carbon and iron filings, and sand/gravel. The mixture is of such permeability that the flow of groundwater is not impeded by the permeable body: preferably, the permeability of the mixture 6 should not be less than the permeablity of the aquifer material.

The trench 5, and the mixture 6 therein, should extend laterally as far as is necessary to ensure that all the contaminated water flows through the mixture. As to height, the trench and the mixture should be so placed as to intercept the whole height of the plume. The mixture need not occupy the portion of the trench 5 that lies above the water table 3; this portion may be filled in with sand or other filler material.

Figure 2:
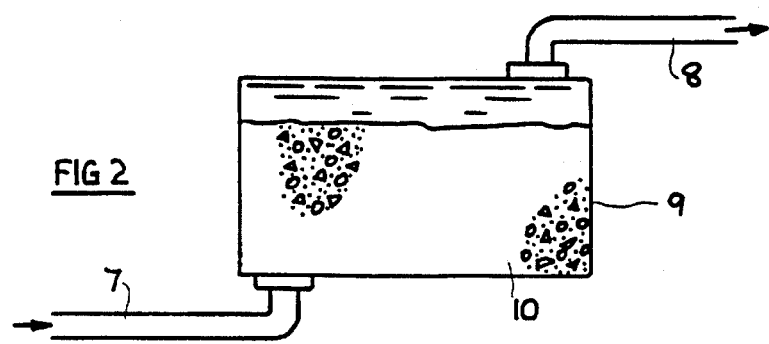
FIG. 2 is a diagrammatic view of another water treatment facility which embodies the invention.

FIG. 2 shows another system for treating contaminated water.

In the FIG. 2 system, the contaminated water is piped via inlet and outlet pipes 7,8 through a vessel 9. The vessel 9 contains a mixture 10 of activated carbon and iron filings. The vessel 9 may comprise a tank, which is placed on, or buried in, the ground: if natural circulation is not available, a pump (not shown) may be provided to feed the water through the system. In FIG. 2, the contaminated water may be, for example, effluent from a factory, or groundwater that has been taken out of the ground, or water that has been drawn off from a well, etc.

It is recognised that the metal in the mixture, whether iron or another metal, is effective to initiate and promote the chemical breakdown of the halogenated hydrocarbon contaminants which lie in close proximity to the metal, and which lie there for a sufficient period of time, and under the correct conditions of pH, temperature, salinity, and so on. One of the major conditions is the exclusion of all oxygen and oxygen-supplying agents from the mixture and from the water, as will now be discussed.

In the FIG. 1 system, the mixture, and the water, all lie below the water table 3, and it can be expected that the natural conditions will therefore be substantially anaerobic, without any precautions needing to be taken. The presence of the metal can therefore be expected to drive down the Eh voltage of the water entering the mixture in the trench in a reasonably short period of time, so that breakdown of the contaminant will quickly commence.

Not much can be done, in any event, with flowing groundwater, to change such conditions as pH, temperature, presence of other dissolved or suspended substances, etc, so that the system of FIG. 1 is only applicable in those cases where conditions happen to be right naturally. The correct conditions often do prevail, however.

The system of FIG. 2 is more versatile, though less economical. The vessel 9 should be airtight, all oxygen, or oxydising agents, being excluded. Conditions in the vessel may be monitored, and adjustments made to temperature, pH, and so on, as may be required. Conventional instruments, and apparatus and procedures, exist for detecting the need for, and effecting, such adjustments, and are not described here.

In the conventional systems where water is passed through a body of activated carbon, the water passes through the body, typically, in a few minutes. The larger the body of activated carbon, and the longer the residence time of the water therein, the more molecules of the contaminant would be expected to be taken out of the water—though of course, in the conventional systems, the contaminant would remain intact on the activated carbon. The contaminant would gradually build up on the activated carbon until the activated carbon became saturated, and no more contaminant could be adsorbed from the water.

In the conventional system, the rate of flow of water that could be treated by a given body of activated carbon was determined by the rate at which the contaminant could be adsorbed into the activated carbon: in the invention, in many real practical applications, the rate at which the contaminant is chemically broken down can even be faster than the rate at which the contaminant, in the conventional systems, was merely adsorbed.

It may be regarded that whatever molecules of the dissolved contaminant are adsorbed from the water will not be released and will not escape into the water outflow, and will eventually be broken down due to proximity to the iron: therefore, if the residence time of the water in the activated carbon is sufficient to extract substantially all the molecules of the contaminant, then substantially all of the contaminant will be broken down.

The metal that is used in the mixture preferably is iron, since iron is widely available in granular form inexpensively, as waste from many processes. The grain size of the granules of the metal should be as small as possible, in order that the granules may have a maximum reactive area.

On the other hand, the metal should not be in the form of so fine a dust as would make it difficult to handle.

The metal need not be elemental, so that steel or cast iron granules may be used, rather than pure iron. The metal selected for use in the invention should not be of a very low electrochemical activity: silver or gold, for example, would not be effective. Metals such as zinc, iron, aluminum, are candidates for selection on the basis of their electro- chemical activity, and considerations of practical availability will usually favour iron, as mentioned.

The presence of oxide on the metal is generally detrimental, and pro-treatment, for example an acid wash, is usually to be recommended to remove at least some of the oxide and expose the metal.

It has been found that sometimes the speed of the reactive effect attributable to a metal may be affected by the presence of other electrochemically active metals: for example, if galvanized iron is used as the source of the granules, the breakdown rate can be expected to be slightly slowed by the presence of the zinc, as compared with iron by itself. Also, it has been found that granules of stainless steel are not so effective as granules of ordinary carbon steels.

In some cases, it has been proposed that certain pairs of metals, mixed or alloyed together, will out-perform a single metal in breaking down such contaminants as the halogenated hydrocarbons. It should be understood that the invention may be used to advantage when the metal in the mixture is in fact such a pair of metals.

FIG. 3A is a graph which plots the gradually falling concentration of a contaminant under certain conditions. In the model system represented by FIG. 3A, water containing 1400 parts per billion of trichloroethylene (TCE) was passed through a permeable body. The permeable body was in the form of a column, of a length of 0.6 meters.

The body was a mixture comprising 10% (by mass) iron filings, 0.5% activated carbon, and the rest of the mixture was silica sand.

The conditions were such that the water travelled through the mixture at a velocity of 318 cm/day, or 13 cm per hour.

The water entering the mixture had a concentration of TCE of, as shown, 1400 parts per billion. Plot 25 is the plot of the concentration of TCE in the water after a steady state had been reached. The points which define the plot were measures of the TCE concentration at the particular points in the column. As may be seen, the water at the 40 cm mark contained practically no detectable TCE. The legal limit of TCE in drinking water, in some jurisdictions, is 30 ppb, and water beyond about the 15 cm mark was within this limit.

For comparison, plot 26 shows the effect of omitting the metal, ie of simply adsorbing the TCE out of the water, and onto the activated carbon. At first, the contaminant was removed from the water at a rate which, though slower, was comparable with the rates shown in plot 25.

As the activated carbon became saturated with contaminant, the rate at which TCE was taken out of the water started to decrease, and when the activated carbon was fully saturated, no further contaminant was removed at all. Thus the final steady state of the plot 26 would be the line 26F.

It should be noted that, unlike plot 25, plot 26 merely represents the loss of the contaminant from the water: the contaminant itself remained intact on the activated carbon, so that the activated carbon became gradually more saturated. Thus, when the contaminant was merely adsorbed onto the activated carbon, the "front" of contaminant would progress gradually along the column, until finally no further adsorption took place. When the contaminant is chemically broken down, on the other hand, a steady state condition becomes established wherein the effectiveness of the mixture does not diminish.

Tests with other contaminants show a similar pattern. In the model system represented by FIG. 3B, water containing 1400 parts per billion of carbon tetrachloride (CTC) was passed through the permeable body. Again, the body was a mixture comprising 10% (by mass) iron filings, 0.5% activated carbon, and the rest of the mixture was silica sand, and the conditions were such that the water travelled through the mixture at a velocity of 318 cm/day, or 13 cm per hour.

The water entering the mixture had a concentration of CTC of, as shown, 1400 ppb. Plot 27 (FIG. 3B) shows the concentration of CTC, which, as shown, dropped very quickly to zero: however, the contaminant at this stage had not disappeared as a hazardous substance but had merely been converted into chloroform. Plot 28 shows the chloroform concentration, showing that after the contaminated water had travelled about 2 cm into the mixture, the concentration of chloroform rose to a maximum of 700 ppb, as the CTC dropped to zero. After that, the chloroform gradually broke down, and by the time the water had reached the 30 cm mark no chloroform could be detected in the water. The plots 27,28 represent a steady state condition, in which the rate at which the mixture broke down the contaminant remained undiminished for long periods.

The plots 25 and 27,28 show the effect by which the contaminants undergo chemical breakdown, down to virtual disappearance. It should be noted that these plots represent steady state conditions: the whole flow of the water that entered the permeable body continued to be contaminated at the 1400 ppb level, ie the contaminant was not just supplied as a single pulse.

FIG. 4 is a graph that shows the effects of including mere activated carbon in the mixture. Plot 35 shows the rate of chemical breakdown of TCE when no activated carbon was present in the mixture, ie when only metal, in this case iron filings, was present. Now, the contaminant is substantially not retarded at all, but passes through the metal at the same velocity as the water. When activated carbon is included, and the proportion increased, the retardation effect occurs: the plot therefore moves to the left in FIG. 4. Thus, plot 36 represents the rate at which TCE breaks down when the contaminant moves at half the velocity of the water. The plots 37–39 represent progressively mere activated carbon in the mixture. The proportions required to achieve the desired degree of retardation vary according to conditions, but the said mixture of 10% iron: 0.5% activated carbon has, as described, been effective. The level of retardation shown in plot 39 may, depending on conditions, represent a mixture of, for example, equal quantities of activated carbon and iron filings.

An upper limit to the proportion of activated carbon might, in practice, apply in some cases. If too much activated carbon were provided, the molecules of contaminant taken out of the water might be so strongly adsorbed into the activated carbon that the molecules became protected, by the fact of their adsorption into the activated carbon, from the breakdown action of the metal. The quantity of, and the physical spacing of the granules of iron, in relation to the granules of activated carbon, is important: there should be enough granules of iron that the granules of iron are physically close enough to each other to exert the Eh lowering effect, and the chemical break-down influence, throughout the activated carbon.

It should be noted that the mixture includes also the inert filler material, silica sand. Apart from simply providing bulk, the silica sand serves to prevent consolidation, which might be expected to occur, especially in the metal, over long periods and which might lead to local non-homogeneities in the permeability of the mixture.

The plots of the rate of contaminant breakdown would be expected to move to the right in FIG. 4 in the case where the nature of the contaminant, or the prevailing conditions of temperature, pH, etc, give rise to a slower characteristic breakdown rate. The proportions of activated carbon to iron filings, and the quantity of bulk filler material needed, therefore do need to be tailored to the particular conditions, as will be determined by local tests.

As mentioned, in the invention the contaminant does not build up on the activated carbon by progressive continuing adsorption. Since the contaminant does not remain adsorbed into the activated carbon, the activated carbon can be expected to last indefinitely. The metal however is gradually used up in the process of breaking down the contaminant, and after a time the metal would need to be replaced.

It would be possible to add new metal into the vessel shown in FIG. 2, though it would hardly be practical to add new metal into a trench as shown in FIG. 1. When the trench version is specified, a margin of extra metal should be included in the trench. On the other hand, excavating a trench does not entail a huge expense, and to provide a second trench later, if the first proved inadequate, would often not be a problem.

One disadvantage of the "metals" system, which is shared by the invention, is that, although the halogenated organic materials are destroyed, the metals themselves sometimes can cause the water to become tainted. This is especially important if the water is to enter a drinking-water supply system soon after being treated. If the treated water is to spend a long period passing slowly through an aquifer, though, the problem of tainting by the metals can be expected to be insignificant.

I claim:

1. Procedure for treating contaminated water, by passing the water containing contaminant in solution through a permeable body of treatment material comprising particles of an adsorptive material physically mixed with particles of a metal, wherein:

the nature of the contaminant and the nature of the metal are such that the contaminant breaks down by chemical reaction into chemically distinct and different substances when brought into, and during the course of, prolonged contact with the particles of metal;

the nature of the adsorptive material is such that the contaminant is adsorbed out of solution onto the particles of adsorptive material upon the contaminated water being passed over and through the permeable mixture;

the adsorptive capacity of the adsorptive material is such that the velocity of the contaminant passing through the permeable mixture is substantially more retarded than the velocity of the water passing through the permeable body;

whereby the contaminant, being retarded on and by the parities of adsorbent material, is held physically adjacent to the particles of metal for a substantially longer period of time than the passing water, and is so held long enough for chemical breakdown of the contaminant to take place;

and the procedure includes the step of so disposing and arranging the mixture that all oxidising agents and materials, including atmospheric oxygen, are excluded from contact with the mixture.

2. Procedure of claim 1, wherein the metal is in granular form.

3. Procedure of claim 1, wherein the adsorptive material is activated carbon.

4. Procedure of claim 1, wherein:

the water is groundwater contained within its native aquifer, and the contaminant occupies a plume within the aquifer moving through the aquifer;

the procedure includes the steps of excavating a trench in the material of the aquifer across the path of the moving plume;

of placing the mixture within the trench, the arrangement thereof being such that the plume of contaminated water passes through the mixture.

5. Procedure of claim 1, wherein the mixture includes also an inert filler material.

6. Procedure of claim 1, wherein the adsorptive material is activated carbon, and the metal is iron in the form of iron or steel filings, and wherein the mixture comprises 10% by mass of the filings, 0.5% by mass of the activated carbon, in a bulk of silica sand.

7. Procedure of claim 1, wherein the adsorptive material is activated carbon, and the metal is iron in the form of iron or steel filings, and wherein the proportions thereof in the mixture are between 1 part activated carbon to 20 parts metal, and equal parts of activated carbon and metal, by mass, in a bulk of silica sand.

8. Procedure of claim 1, wherein the said metal consists solely of one single element.

9. Procedure of claim 8, wherein the metal is iron.

10. Procedure of claim 1, wherein the nature of the mixture is such that the surfaces of the particles of metal are accessible for direct exposure to the contaminated water, the surfaces being substantially free of such coatings and inclusions as would, if present, inhibit the completion of the said chemical reaction.

11. Procedure of claim 10, wherein the metal is bare, and the surface thereof is in direct wetting contact with the contaminated water.

12. Procedure of claim 1, wherein the chemically distinct substances resulting form the break down reaction are substantially harmless.

13. Procedure of claim 1, wherein the contaminated water is groundwater in its native aquifer.

14. Procedure of claim 1, wherein:

the contaminated water is groundwater within, and moving through, its native aquifer;

the procedure includes the step of placing the said permeable body of treatment material in the ground, in the path of the moving contaminated groundwater, and of causing the contaminated groundwater to pass therethrough.

15. An apparatus for treating contaminated water, wherein:

at least one of the contaminants in the water is of the kind which breaks down by chemical reaction into chemically distinct and different substances when brought into, and during the course of, prolonged contact with particles of metal;

the apparatus includes a body of metal particles, and includes a means for directing the flow of contaminated water through the said body;

the apparatus includes a means for excluding oxidising agents and materials, including atmospheric oxygen, from the body of metal particles, and the means is effective to exclude the said agents and materials;

the apparatus includes a body of an adsorbent material, of the type which is capable of adsorbing the said at least one contaminant;

the body of metal particles and the body of adsorbent material are mixed together to form a mixture, the mixture being such that the mixture is permeable to the flow of water therethrough;

the mixture is positioned within a flowing stream of the contaminant-containing water;

the adsorptive capacity of the body of adsorptive material, and its disposition in the mixture, are such that the flow rate of the contaminant passing through the permeable mixture is substantially more retarded than the flow rate of the water passing through the permeable mixture;

whereby the contaminant, being retarded on and by the adsorbent material, is held physically adjacent to the particles of metal for a substantially longer period of time than the passing water, and is so held long enough for chemical breakdown of the contaminant to take place.

16. Apparatus of claim 15, wherein the apparatus includes also a body of an inert filler material, and the inert filler material is mixed into the permeable mixture.

17. Apparatus of claim 15, wherein the contaminated water is groundwater flowing through an aquifer;

the means for directing the water to flow through the mixture comprises a trench excavated in the path of the contaminated water, and comprises the presence of the mixture in the trench;

the means for excluding oxidising agents and material comprises a positioning of the mixture below the water table in the aquifer, whereby the mixture is saturated with the groundwater.

* * * * *